(12) United States Patent
Snyder (10) Patent No.: US 12,292,196 B2
(45) Date of Patent: May 6, 2025

(54) STEAM COOLED HOOD INJECTOR (71) Applicant: RAYTHEON TECHNOLOGIES CORPORATION, Farmington, CT (US)

(72) Inventor: Timothy S. Snyder, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/345,941

(22) Filed: Jun. 30, 2023

(65) Prior Publication Data

US 2025/0003593 A1    Jan. 2, 2025

(51) Int. Cl.
*F23R 3/28* (2006.01)
*F02C 3/30* (2006.01)
*F02C 7/22* (2006.01)

(52) U.S. Cl.
CPC ............... *F23R 3/286* (2013.01); *F02C 3/30* (2013.01); *F02C 7/222* (2013.01)

(58) Field of Classification Search
CPC ........ F02C 3/30; F23D 11/101; F23D 11/105; F23D 11/106; F23D 11/107; F23D 11/383; F23D 14/48; F23D 2206/10; F23R 3/286
See application file for complete search history.

(56) References Cited

U.S. PATENT DOCUMENTS

| 4,425,755 A | 1/1984 | Hughes |
| 4,600,151 A | 7/1986 | Bradley |
| 5,054,279 A | 10/1991 | Hu |
| 5,423,173 A | 6/1995 | Lemon et al. |
| 5,784,875 A | 7/1998 | Statler |
| 8,813,473 B2 | 8/2014 | Fletcher et al. |
| 2013/0040255 A1 | 2/2013 | Shi et al. |
| 2013/0055698 A1* | 3/2013 | Fletcher ............ F02C 3/30 60/39.55 |
| 2015/0253010 A1 | 9/2015 | Schlein |
| 2016/0209037 A1* | 7/2016 | Dai ................... F23R 3/12 |
| 2022/0268213 A1 | 8/2022 | Morenko et al. |
| 2023/0035231 A1 | 2/2023 | Hines |

OTHER PUBLICATIONS

European Patent Office, European Search Report dated Sep. 23, 2024 in Application No. 24172205.7.

* cited by examiner

*Primary Examiner* — Scott J Walthour
(74) *Attorney, Agent, or Firm* — SNELL & WILMER L.L.P.

(57) ABSTRACT

A fuel nozzle guide assembly for a gas turbine engine is provided. The fuel nozzle guide assembly includes a housing; a tube arranged in the housing and defining a portion of a first fluid passage therein, the first fluid passage configured to include a first fluid, wherein a second fluid passage is defined, in part, between an exterior surface of the tube and an interior surface of the housing, the second fluid passage configured to include a second fluid; an air inflow tube, the air inflow tube defining a central air passage and configured to include a third fluid; an air inflow assembly defining a third fluid passage and configured to include a fourth fluid; and a nozzle outlet configured to receive each of the first fluid, the second fluid, the third fluid, and the fourth fluid to cause mixing thereof.

14 Claims, 6 Drawing Sheets

STEAM COOLED HOOD INJECTOR

GOVERNMENT LICENSE RIGHTS

This invention was made with Government support under a Contract DE-FE00032171 awarded by the United States Department of Energy. The Government has certain rights in this invention.

FIELD

The present disclosure relates to components for combustors in turbine engines, and more particularly, a steam cooled hood injector for a gas turbine engine.

BACKGROUND

Gas turbine engines, such as those that power modern commercial and military aircraft and those that are used for land-based power generation, include a compressor section to pressurize a supply of air, a combustor section to burn a fuel in the presence of the pressurized air, and a turbine section to extract energy from the resultant combustion gases to generate thrust or electrical power. The combustor section generally includes a plurality of circumferentially distributed fuel injectors that project toward a combustion chamber to supply fuel to be mixed and burned with the pressurized air. Gas turbine engines typically include a plurality of centralized staging valves in combination with one or more fuel supply manifolds that deliver fuel to the fuel injectors.

Each fuel injector typically has an inlet fitting connected to the manifold at the base, a conduit connected to the base fitting, and a nozzle connected to the conduit to spray the fuel into the combustion chamber. Appropriate valves or flow dividers are provided to direct and control the flow of fuel through the nozzle.

Some current land-based gas turbine fuel injectors are configured for and optimized for dual fuel (e.g., No. 2 Fuel Oil and Methane) with water injection to reduce NOx. As the gas turbine industry transitions away from using hydrocarbon-based fuels, there is a desire to mix hydrogen with Methane at very high levels, up to and including 100% hydrogen which is being considered as the best carbon-neutral fuel for both land-based power generation and aircraft gas turbines. Because of the high flame speeds and reaction rates of hydrogen, flashback can occur at high pressure and temperature allowing the flame to attach on the gas fuel swirl vanes causing damage. As such, improved systems may be necessary to implement hydrogen use in aircraft combustion systems.

SUMMARY

A fuel nozzle guide assembly for a gas turbine engine is disclosed herein. The fuel nozzle guide assembly includes a housing and a tube arranged in the housing and defining a portion of a first fluid passage therein, the first fluid passage configured to include a first fluid. A second fluid passage is defined, in part, between an exterior surface of the tube and an interior surface of the housing, the second fluid passage configured to include a second fluid. The fuel nozzle guide assembly includes an air inflow tube, the air inflow tube arranged along a nozzle axis, the air inflow tube defining a central air passage and configured to include a third fluid, the first fluid passage extends axially at a first position radially outward from the central air passage and the second fluid passage extends axially at a second position radially outward from the first fluid passage. The fuel nozzle guide assembly includes an air inflow assembly defining a third fluid passage and configured to include a fourth fluid, the third fluid passage is radially outward from the second fluid passage and the fourth fluid is steam. The fuel nozzle guide assembly includes a nozzle outlet configured to receive each of the first fluid, the second fluid, the third fluid, and the fourth fluid to cause mixing thereof.

In various embodiments, mixing the fourth fluid with the first fluid, the second fluid, and the third fluid reduces auto-ignition and flashback inside the fuel nozzle guide assembly. In various embodiments, the air inflow assembly is at least one of an outer vane swirl assembly or guide swirler assembly. In various embodiments, the air inflow assembly receives the fourth fluid via an annular hood. In various embodiments, the annular hood comprises an inside diameter manifold and an outside diameter manifold. In various embodiments, the annular hood comprises a plurality of circumferentially distributed hood ports that direct the steam to the air inflow assembly.

In various embodiments, the second fluid is a gaseous fuel comprising 100% hydrogen. In various embodiments, the second fluid is mixed with the steam or liquid water. In various embodiments, the first fluid is a liquid fuel and the third fluid is air. In various embodiments, the first fluid is mixed with the steam or liquid water.

Also disclosed here in a combustor for a gas turbine engine. The combustor includes a hood and fuel nozzle guide assembly. The fuel nozzle guide assembly includes a housing and a tube arranged in the housing and defining a portion of a first fluid passage therein, the first fluid passage configured to include a first fluid. A second fluid passage is defined, in part, between an exterior surface of the tube and an interior surface of the housing, the second fluid passage configured to include a second fluid. The fuel nozzle guide assembly includes an air inflow tube, the air inflow tube arranged along a nozzle axis, the air inflow tube defining a central air passage and configured to include a third fluid, the first fluid passage extends axially at a first position radially outward from the central air passage and the second fluid passage extends axially at a second position radially outward from the first fluid passage. The fuel nozzle guide assembly includes an air inflow assembly defining a third fluid passage and configured to include a fourth fluid, the third fluid passage is radially outward from the second fluid passage and the fourth fluid is steam and wherein the air inflow assembly receives the fourth fluid via the hood. The fuel nozzle guide assembly includes a nozzle outlet configured to receive each of the first fluid, the second fluid, the third fluid, and the fourth fluid to cause mixing thereof.

In various embodiments, mixing the fourth fluid with the first fluid, the second fluid, and the third fluid reduces auto-ignition and flashback inside the fuel nozzle guide assembly. In various embodiments, the air inflow assembly is at least one of an outer vane swirl assembly or guide swirler assembly. In various embodiments, the hood is an annular hood. In various embodiments, the annular hood comprises an inside diameter manifold and an outside diameter manifold. In various embodiments, the annular hood comprises a plurality of circumferentially distributed hood ports that direct the steam to the air inflow assembly.

In various embodiments, the second fluid is a gaseous fuel comprising 100% hydrogen. In various embodiments, the second fluid is mixed with the steam or liquid water. In various embodiments, the first fluid is a liquid fuel and the third fluid is air. In various embodiments, the first fluid is mixed with the steam or liquid water.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion, or to the direction associated with the inlet of the gas turbine engine.

As stated previously, as the gas turbine industry transitions away from using hydrocarbon-based fuels, there is a desire to mix hydrogen with Methane at very high levels, up to and including 100% Hydrogen ($H_2$). However, because of the high flame speeds and reaction rates of hydrogen, flashback may occur at high pressure and temperature allowing the flame to attach on the gas fuel swirl vanes causing damage. In systems where 100% Hydrogen ($H_2$) is burned at high pressure and high temperatures, fuel injectors/nozzles may be exposed to flashback and auto-ignition inside the fuel injector. Typically, liquid water may be mixed with fuel inside the fuel injector to control 'nitrogen oxide' (NOx) emissions and flame location. However, liquid water is heavy to carry in an aircraft. Another source of water in an aircraft is from jet engine exhaust which may be mixed with Hydrogen ($H_2$) inside the fuel injector as steam, however mixing the steam with the Hydrogen ($H_2$) requires significantly larger flow passages.

Disclosed here in a steam cooled hood injector for a gas turbine engine. In various embodiments, the annular hood of a combustor is modified with an inside diameter manifold and an outside diameter manifold that inject steam into the airstream feeding the fuel nozzle via one or more of an outer vane swirl assembly or guide air passages around the fuel nozzle. In various embodiments, steam, which is a natural byproduct of Hydrogen ($H_2$) combustion, may be extracted from the exhaust of the gas turbine engine and directed into the inside diameter manifold and the outside diameter manifold of the annular hood and then into the airstream feeding the fuel nozzle via one or more of the outer vane swirl assembly or the guide air passages around the fuel nozzle. In various embodiments, the steam cools the air to reduce bulkhead temperatures that operate at high temperatures when burning at or near 100% Hydrogen ($H_2$). In various embodiments, steam injection into one or more of the outer vane swirl assembly, the guide air passages, the liquid fuel passage, or the gas fuel passage of the fuel injector reduces or prevents auto-ignition and flashback inside the fuel nozzle. In various embodiments, the addition of steam may also reduce flame temperatures thereby reducing NOx.

Figure 1:
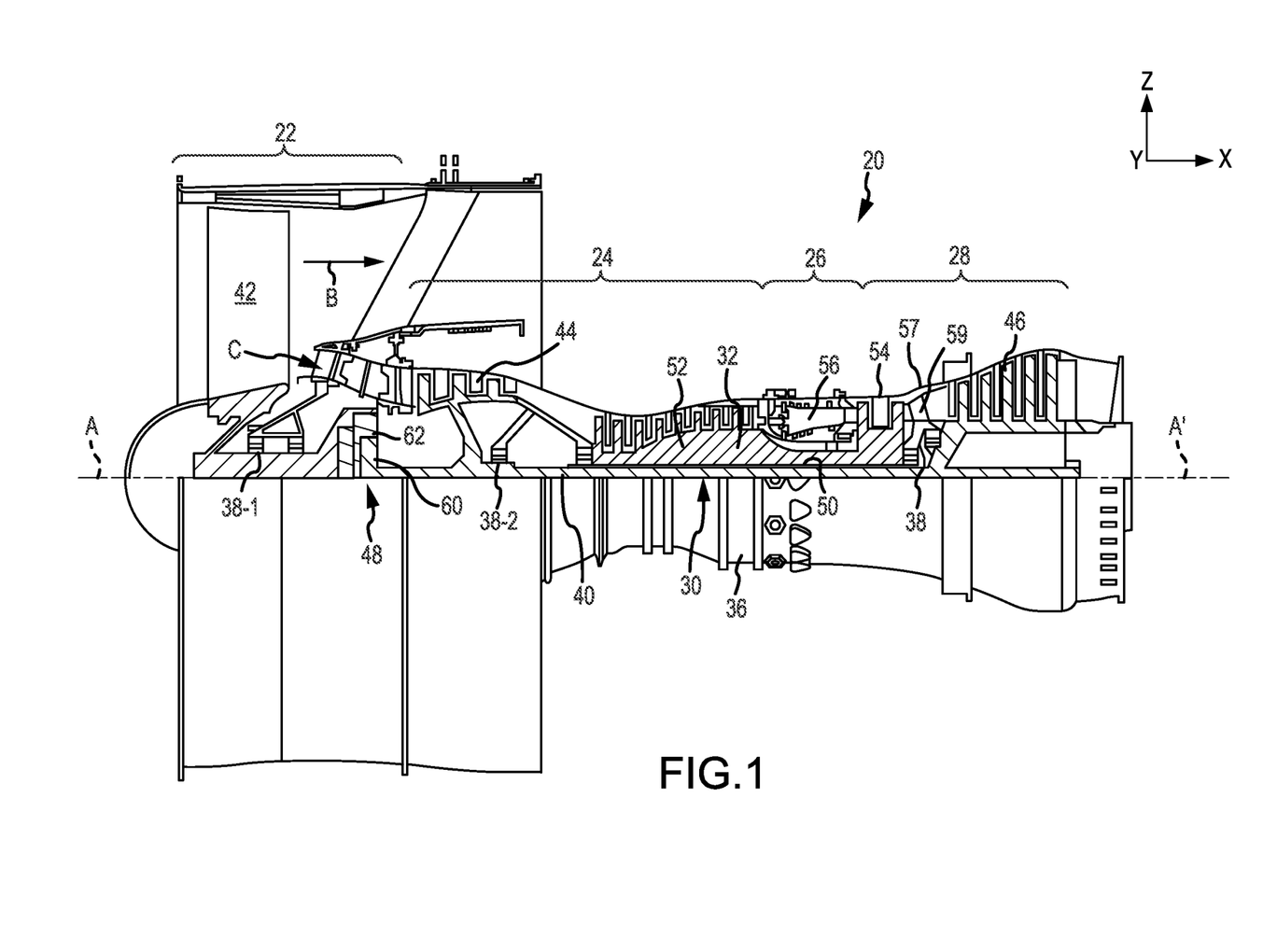
FIG. 1 illustrates a cross-sectional view of a gas-turbine engine, in accordance with various embodiments.

With reference to FIG. 1, a cross sectional view, in an x-direction, a gas turbine engine 20 is illustrated shown according to various embodiments. Gas turbine engine 20 may be a two-spool turbofan that generally incorporates a fan section 22, a compressor section 24, a combustor section 26, and a turbine section 28. In operation, fan section 22 may drive fluid, i.e. air, along a path of bypass airflow B while compressor section 24 may drive the fluid along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines.

Gas turbine engine 20 may generally include a low-speed spool 30 and a high-speed spool 32 mounted for rotation about an engine central longitudinal axis A-A' relative to an engine static structure 36 or engine case via several bearing systems 38, 38-1, 38-2, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, bearing system 38-2, etc.

Low-speed spool 30 may generally include an inner shaft 40 that interconnects a fan 42, a low-pressure compressor 44, and a low-pressure turbine 46. Inner shaft 40 may be connected to fan 42 through a geared system 48 that may drive the fan 42 at a lower speed than low-speed spool 30. Geared system 48 may include a gear assembly enclosed within a gear housing. Geared system 48 couples the inner shaft 40 to a rotating fan structure. High-speed spool 32 may include an outer shaft 50 that interconnects a high-pressure compressor 52 and high-pressure turbine 54. A combustor section 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low-pressure compressor 44 then high-pressure compressor 52, mixed and burned with fuel in the combustor section 56, then expanded over high-pressure turbine 54 and low-pressure turbine 46. The mid-turbine frame 57 includes airfoils 59 which are in the core airflow path C. Turbines 46, 54 rotationally drive the respective low-speed spool 30 and high-speed spool 32 in response to the expansion. It will be appreciated that each of the positions of the fan section 22, compressor section 24, combustor section 26, turbine section 28, and geared system 48 may be varied. In various embodiments, geared system 48 may be located aft of combustor section 26 or even aft of turbine section 28, and fan section 22 may be positioned forward or aft of the location of geared system 48.

The gas turbine engine 20, in various embodiments, is a high-bypass geared aircraft engine. In various embodiments, the gas turbine engine 20 bypass ratio is greater than about six (6), with an example embodiment being greater than about ten (10), the geared system 48 is an epicyclic gear train, such as a planetary gear system or other gear system, with a gear reduction ratio of greater than about 2.3 and the low-pressure turbine 46 has a pressure ratio that is greater than about five. In various embodiments, the gas turbine engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm (pound of mass) of fuel being burned divided by lbf (pound of force) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2:
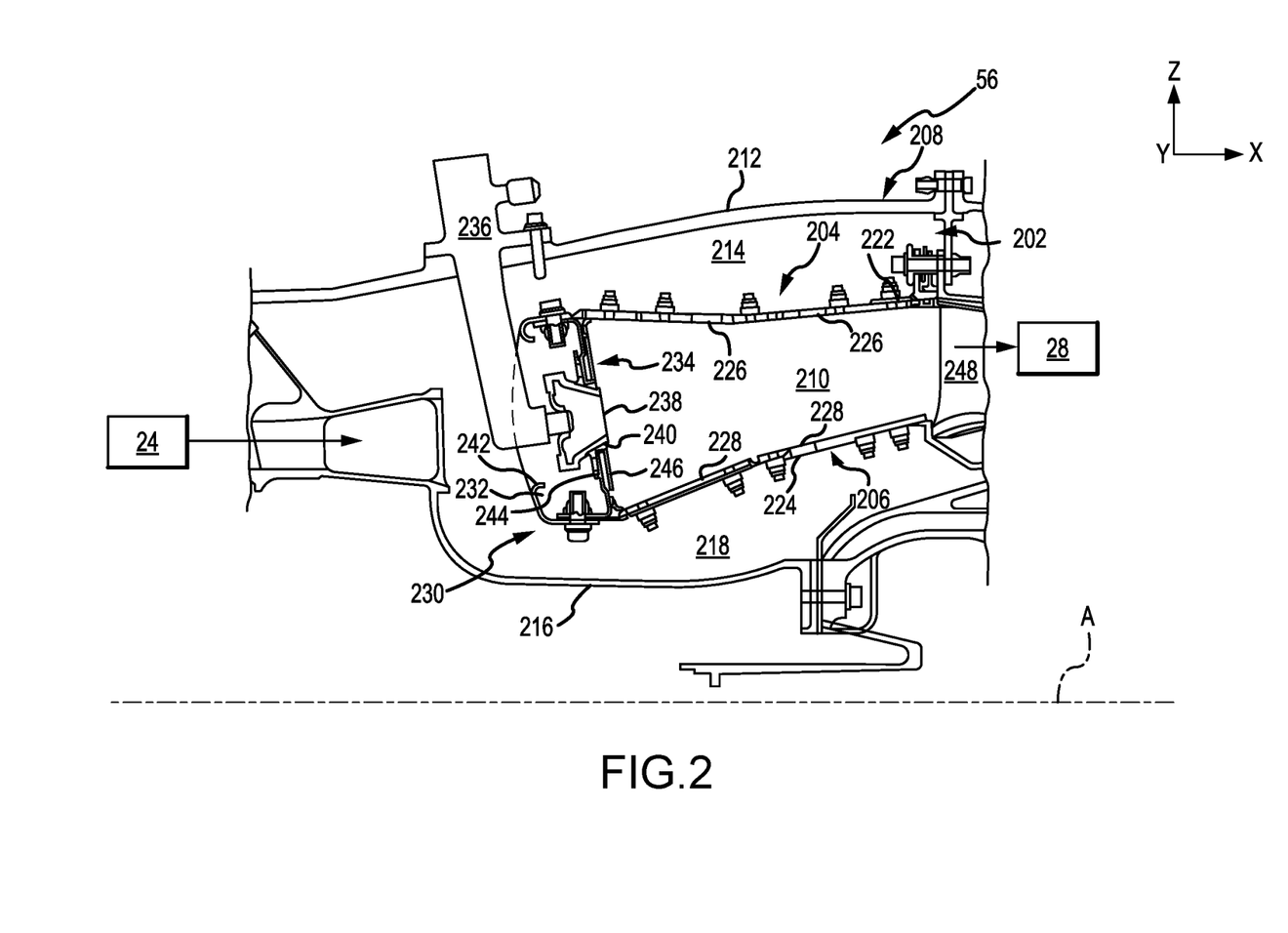
FIG. 2 illustrates is a cross-sectional view of a combustion section of the gas-turbine engine that may incorporate embodiments of the present disclosure, in accordance with various embodiment.

Referring to FIG. 2, a cross sectional view, in an x-direction, of a combustor section 56 for use in a gas turbine engine is illustrated, in accordance with various embodiments. The combustor section 56 includes a combustor 202 with an outer combustor wall assembly 204, an inner combustor wall assembly 206, and a diffuser case 208. The outer combustor wall assembly 204 and the inner combustor wall assembly 206 are spaced apart such that a combustion chamber 210 is defined therebetween. The combustion chamber 210 may be generally annular in shape.

The outer combustor wall assembly 204 is spaced radially inward from an outer diffuser case 212 of the diffuser case 208 to define an outer annular plenum 214. The inner combustor wall assembly 206 is spaced radially outward from an inner diffuser case 216 of the diffuser case 208 to define an inner annular plenum 218. It should be understood that although a particular combustor arrangement is illustrated, other combustor types, such as can combustors, with various combustor liner/wall arrangements will also benefit from embodiments of the present disclosure.

The combustor wall assemblies 204, 206 contain the combustion products for direction toward a turbine section 28 of a turbine engine. Each combustor wall assembly 204, 206 generally includes a respective support shell 222, 224 which supports one or more liner panels 226, 228, respectively mounted to a hot side of the respective support shell 222, 224. Each of the liner panels 226, 228 may be generally rectilinear and manufactured of, for example, a nickel based super alloy, ceramic or other temperature resistant material and are arranged to form a liner array. In various embodiments, the liner array may include a multiple of forward liner panels and a multiple of aft liner panels that are circumferentially staggered to line the hot side of the outer support shell 222. A multiple of forward liner panels and a multiple of aft liner panels may be circumferentially staggered to line the hot side of the inner shell 224.

The combustor 202 further includes a forward assembly 230 immediately downstream of a compressor section of the engine to receive compressed airflow therefrom. The forward assembly 230 generally includes an annular hood 232 and a bulkhead assembly 234 which locate a multiple of fuel nozzles 236 (one shown) and a multiple of swirlers 238 (one shown). Each of the swirlers 238 is mounted within an opening 240 of the bulkhead assembly 234 to be circumferentially aligned with one of a multiple of hood ports 242. Each bulkhead assembly 234 generally includes a bulkhead support shell 244 secured to the combustor wall assembly 204, 206, and a multiple of circumferentially distributed bulkhead liner panels 246 secured to the bulkhead support shell 244.

The annular hood 232 extends radially between, and is secured to, the forwardmost ends of the combustor wall assemblies 204, 206. The annular hood 232 forms the multiple of circumferentially distributed hood ports 242 that accommodate the respective fuel nozzle 236 and introduce air into the forward end of the combustion chamber 210. Each fuel nozzle 236 may be secured to the diffuser case module 208 and project through one of the hood ports 242 and the respective swirler 238.

In operation, the forward assembly 230 introduces core combustion air into the forward section of the combustion chamber 210 while the remainder enters the outer annular plenum 214 and the inner annular plenum 218. The multiple of fuel nozzles 236 and adjacent structure generate a blended fuel-air mixture that supports stable combustion in the combustion chamber 210.

Opposite the forward assembly 230, the outer and inner support shells 222, 224 are mounted to a first row of Nozzle Guide Vanes (NGVs) 248. The NGVs 248 are static engine components which direct the combustion gases onto turbine blades in a turbine section of the engine to facilitate the conversion of pressure energy into kinetic energy. The combustion gases are also accelerated by the NGVs 248 because of a convergent shape thereof and are typically given a "spin" or a "swirl" in the direction of turbine rotation.

Although FIG. 2 is illustrative of a specific combustor section configuration, those of skill in the art will appreciate that other combustor configurations may benefit from embodiments of the present disclosure. For example, can combustors, annular combustors, can-annular combustors, and other types of combustors may implement or be configured with embodiments of the present disclosure.

Figure 3:
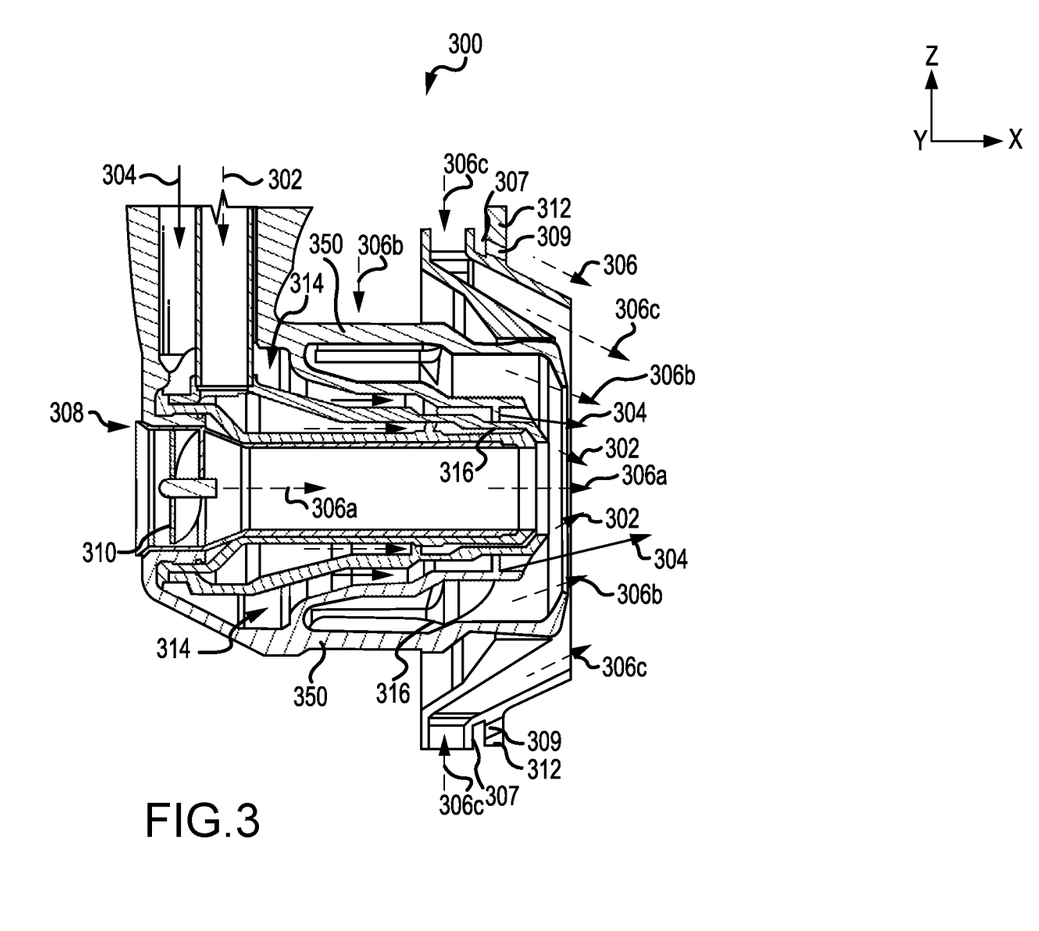
FIG. 3 illustrates a cross sectional view for a flow of fluids through a nozzle assembly, in accordance with various embodiments.

Referring now to FIG. 3, a cross sectional view, in an x-direction, a flow of fluids through a nozzle assembly 300 is illustrated, in accordance with various embodiments. The nozzle assembly 300 provides dual-fuel injection of fuel into a combustion chamber of a turbine engine. A first fuel fluid 302 is provided through a first fluid passage and a second fuel fluid 304 is provided through a second fluid passage, as described above. Air may be introduced to the system to swirl, mix, and provide oxygen for the combustion process. In FIG. 3, the air is indicated as a third fluid 306. The third fluid 306 (e.g., air) may be supplied into the nozzle assembly 300 through an air inflow tube 308 (third fluid inner flow 306a), an outer vane swirl assembly 350 (third fluid outer flow 306b), and a guide swirler assembly 312 (third fluid hood flow 306c). In various embodiments, the outer vane swirl assembly 350 (third fluid outer flow 306b), and guide swirler assembly 312 (third fluid hood flow 306c) may receive directed steam via annular hood 232. The air within the air inflow tube 308 may be swirled or rotated as it passes over or through a helical inflow vane assembly 310. As the fuel fluids 302, 304 (e.g., gas and liquid) are passed through the nozzle assembly 300, the flows will be joined together and mixed with the third fluid 306 (i.e., third fluid inner flow 306a, third fluid outer flow 306b and third fluid hood flow 306c). Some of the third fluid 306 may be directed through a guide swirler assembly 312. The guide swirler assembly 312 may be installed and arranged radially outboard of the nozzle assembly 300 at the outlet of the nozzle assembly 300 and may surround the outer vane swirl assembly 350. The guide swirler assembly 312 is configured to impart swirl to air flowing through a passage 307 of the guide swirler assembly 312, while an array of cooling holes 309 provide cooling to the outside surface of the passage 307. The swirl imparted to the air flowing through the passage 307 of the guide swirler assembly 312 may help control the fuel flows, and mixing thereof, as the flows exit the nozzle assembly 300.

As shown, the second fluid fuel may be passed between an annular gas passage 314. As the second fuel fluid 304 reaches the outlet end of the nozzle assembly 300, it will be passed through a plurality of angled vanes 316. The angled vanes 316 may be defined by vanes or other angled walls that are configured to rotate and swirl the second fuel fluid 304 as it is mixed with the other fluids 302, 306. When hydrogen is introduced into the second fluid fuel (e.g., mixture of hydrogen with other fuel, or hydrogen only), the hydrogen may be disrupted at the angled vanes 316 and cause vane wakes that can negatively impact the airflow within nozzle assembly 300 and allow flame holding of the combustion process inside the assembly.

In view of this, various embodiments of the present disclosure are configured to allow use of hydrogen within fuel injectors, and particularly in dual-fuel fuel injectors. In accordance with embodiments of the present disclosure, fuel injector aerodynamics are modified to isolate vane wakes from the flame allowing operation of the fuel injector with high levels of hydrogen content in the fluid (e.g., up to 100%). In accordance with various embodiments of the present disclosure, an inner swirl strength may be reduced, the gas-fuel swirler may be moved upstream relative to the configuration shown in FIG. 3, and a constricting of the gas-fuel passage downstream of the gas-fuel swirler can enable acceleration of the gas-fuel velocity at the exit, thereby isolating the flame from the vane wakes.

Figure 4:
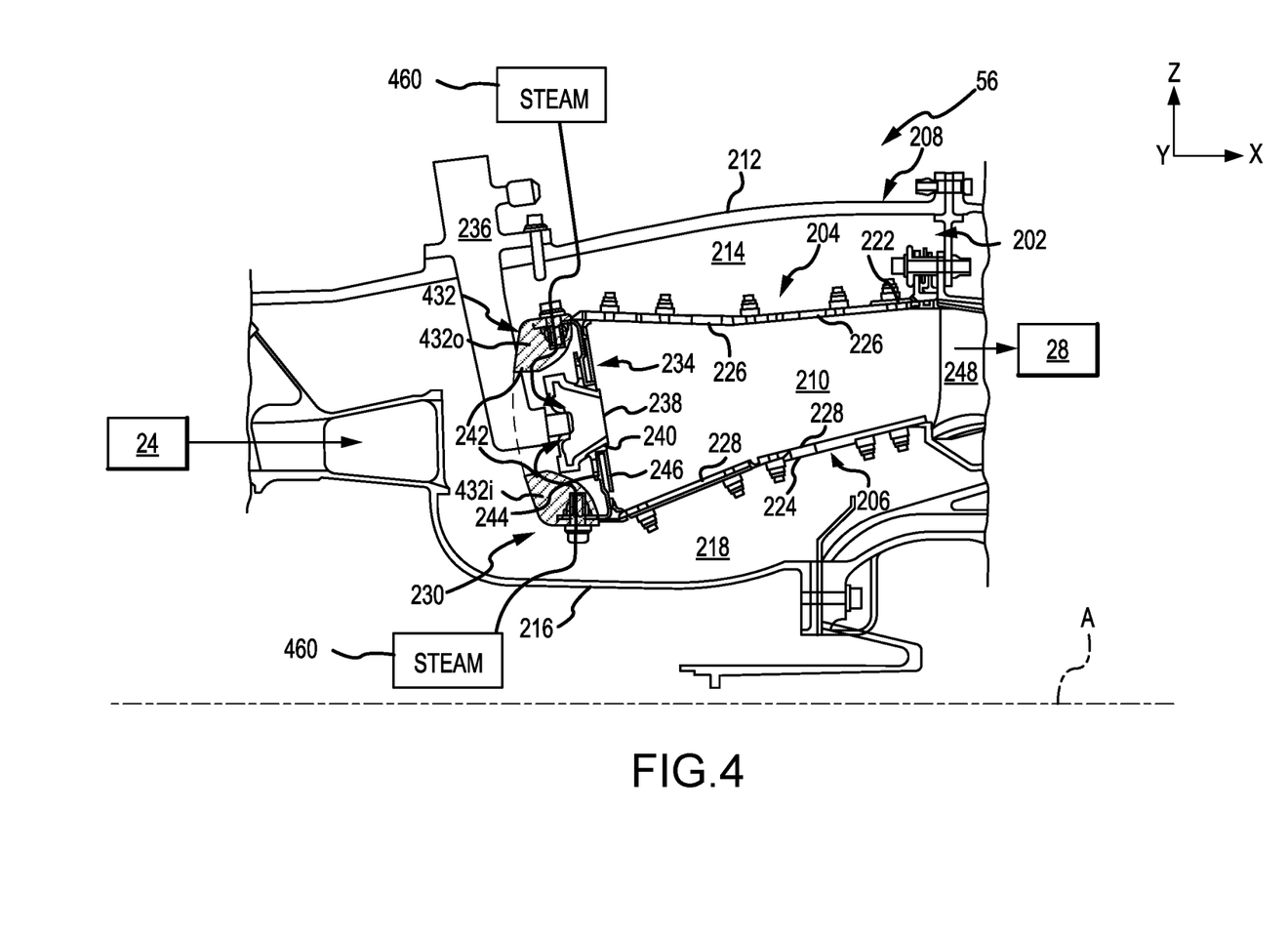
FIG. 4 illustrates a cross sectional view of a combustor section with a modified annular hood for use in a gas turbine engine is illustrated, in accordance with various embodiments.

Referring to FIG. 4, a cross sectional view, in an x-direction, of a combustor section 56 with a modified annular hood for use in a gas turbine engine is illustrated, in accordance with various embodiments. FIG. 4 is similar to FIG. 2 with the exception of a configuration of the annular hood 232. Therefore, elements in FIG. 4 not specifically described in FIG. 4 operate in a similar manner to the elements described in FIG. 2. Referring now to FIG. 4, in various embodiments, the annular hood 432 extends radially between, and is secured to, the forwardmost ends of the combustor wall assemblies 204, 206. In various embodiments, the annular hood may be separated into an inside diameter manifold 432i and an outside diameter manifold 432O. In various embodiments, both the inside diameter manifold 432i and the outside diameter manifold 432O are hollow. In various embodiments, steam 460, which is a natural byproduct of Hydrogen ($H_2$) combustion, may be extracted from the exhaust of the gas turbine engine and directed into the inside diameter manifold 432i and the outside diameter manifold 432O of the annular hood 432. In various embodiments, the steam 406 is then directed though the circumferentially distributed hood ports 242 and into the airstream feeding the fuel nozzle via one or more of an outer vane swirl assembly, i.e. the third fluid outer flow 306b of FIG. 3, or guide air passages, i.e. the third fluid hood flow 306c of FIG. 3, around the fuel nozzle 236. In various embodiments, the steam 406 cools the air to reduce bulkhead temperatures that operate at high temperatures when burning 100% Hydrogen ($H_2$). In various embodiments, the steam 406 injection into one or more of the outer vane swirl assembly, the guide air passages, the liquid fuel passage, or the gas fuel passage of the fuel injector reduces or prevents auto-ignition and flashback inside the fuel nozzle. In various embodiments, the addition of steam 406 may also reduce flame temperatures thereby reducing NOx. In various embodiments, the steam could be supplied to the fuel injector from a separate source than the byproduct of Hydrogen (H2).

Figure 5:
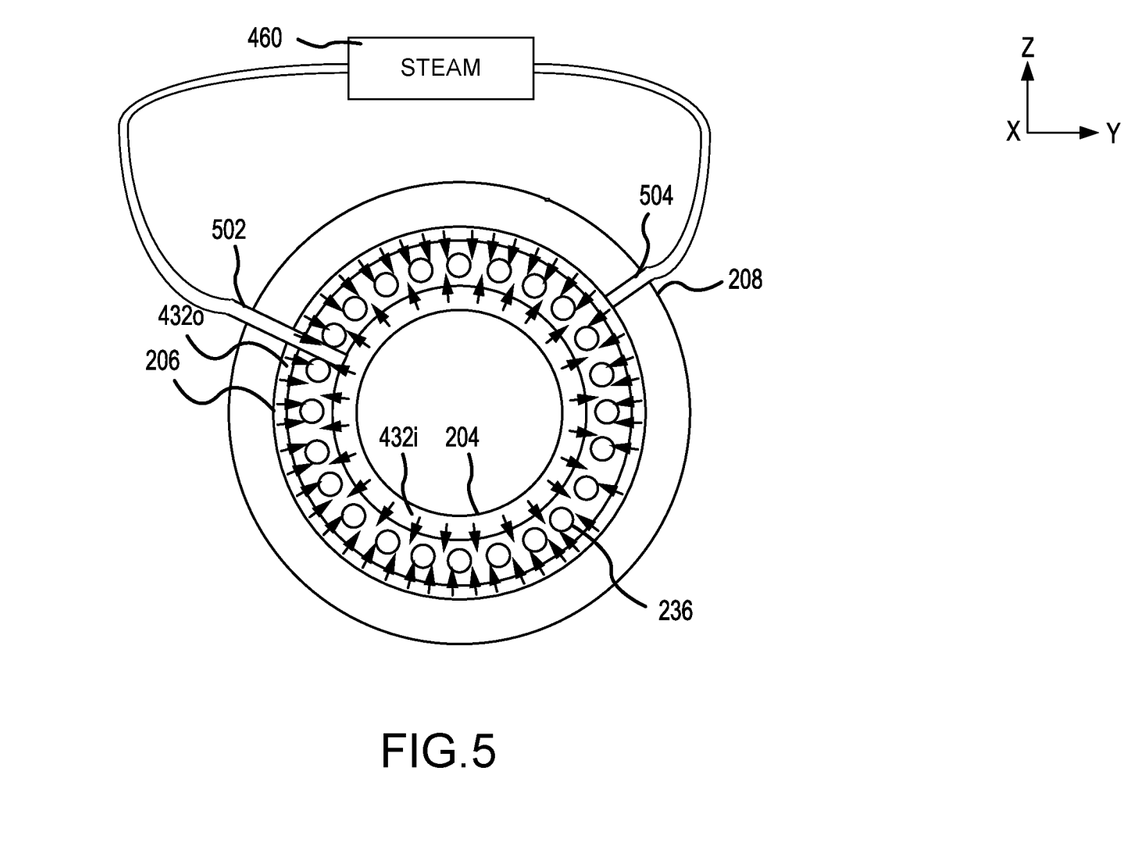
FIG. 5 illustrates a cross sectional view of a front of a combustor section with a modified annular hood for use in a gas turbine engine, in accordance with various embodiments.

Referring to FIG. 5, a cross sectional view, in an y-direction, of a front, in an x-direction, of a combustor section 56 with a modified annular hood for use in a gas turbine engine is illustrated, in accordance with various embodiments. In various embodiments, the annular hood 432 extends radially between, and is secured to, the forwardmost ends of the combustor wall assemblies 204, 206. In various embodiments, the annular hood may be separated into an inside diameter manifold 432*i* and an outside diameter manifold 432O. In various embodiments, both the inside diameter manifold 432*i* and the outside diameter manifold 432O are hollow. In various embodiments, steam 460, which is a natural byproduct of Hydrogen ($H_2$) combustion, may be extracted from the exhaust of the gas turbine engine and directed into the inside diameter manifold 432*i* and the outside diameter manifold 432O of the annular hood 432. In that regard, the inside diameter manifold 432*i* may be fluidly coupled to the steam 460 via feeder tube 502 and the outside diameter manifold 432O may be fluidly coupled to the steam 460 via feeder tube 504. In various embodiments, the steam 406 is directed though the circumferentially distributed hood ports and into the airstream feeding the fuel nozzles 236 via one or more of an outer vane swirl assembly, i.e. the third fluid outer flow 306*b* of FIG. 3, or guide air passages, i.e. the third fluid hood flow 306*c* of FIG. 3, around the fuel nozzles 236. Again, in various embodiments, the steam 406 cools the air to reduce bulkhead temperatures that operate at high temperatures when burning 100% Hydrogen ($H_2$). In various embodiments, the steam 406 injection into one or more of the outer vane swirl assembly, the guide air passages, the liquid fuel passage, or the gas fuel passage of the fuel injector reduces or prevents auto-ignition and flashback inside the fuel nozzle. In various embodiments, the addition of steam 406 may also reduce flame temperatures thereby reducing NOx. In various embodiments, the steam could be supplied to the fuel injector from a separate source than the byproduct of Hydrogen (H2).

Figures 6A, 6B:
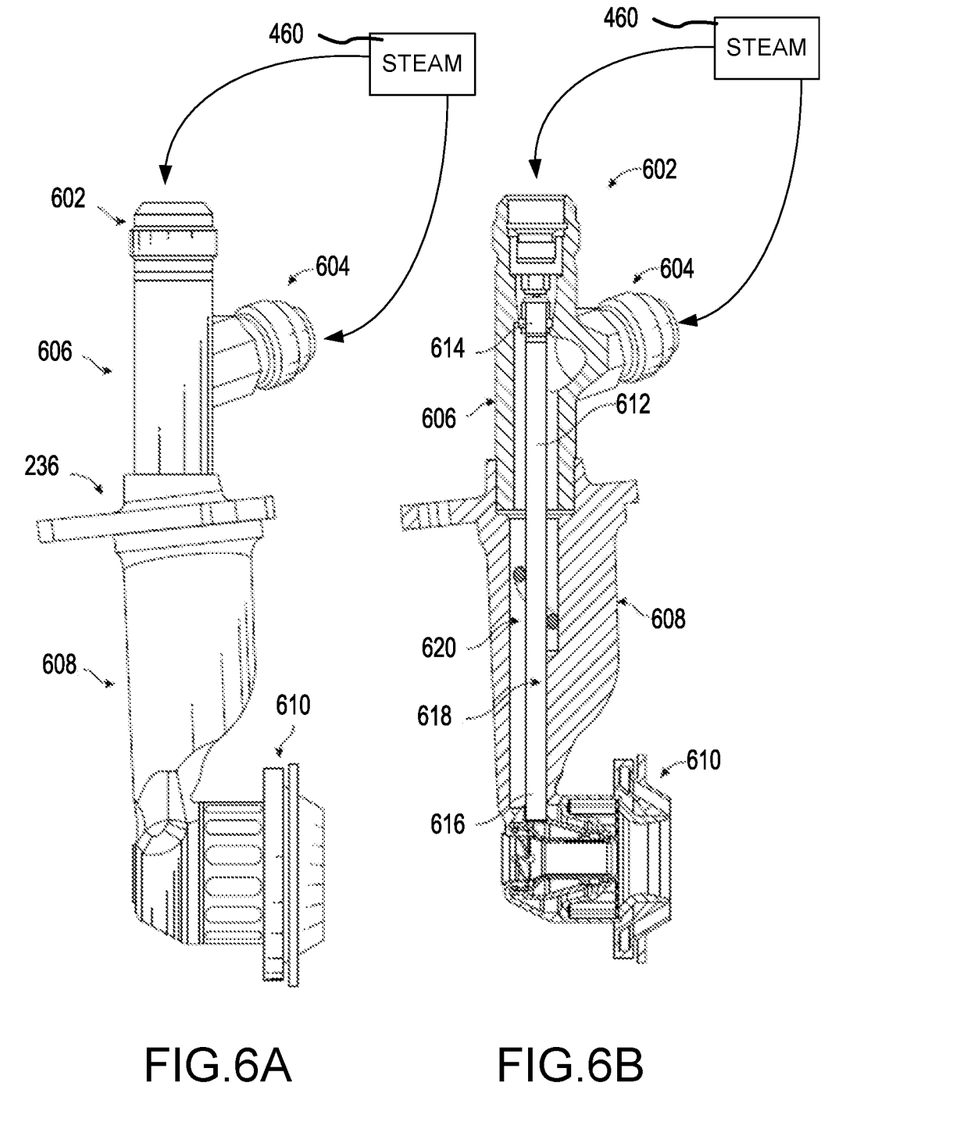
FIGS. 6A and 6B illustrate a cross-sectional view of a fuel injector with options to inject steam into various flow of fluid or gas fuels, in accordance with various embodiments.

Referring now to FIGS. 6A-6B, schematic of a fuel injector for use in combustors and combustor sections of turbine engines is illustrated, in accordance with various embodiments. In various embodiments, the fuel nozzle 236 may be implemented in the above-described combustors and engine configurations, and variations thereon. FIG. 6A illustrates a side elevation view of the fuel nozzle 236 and FIG. 4B illustrates a cross-sectional view of the fuel nozzle 236.

In various embodiments, the fuel nozzle 236 includes a first inlet 602 and a second inlet 604 defined by an inlet housing 606, a support housing 608, and a nozzle assembly 610. In various embodiments, the first inlet 602 is arranged transverse to the second inlet 604. In various embodiments, the inlet housing 606 is received within the support housing 608 and a tube 612 extends through the housings 606, 608 (e.g., as shown FIG. 6B).

In various embodiments, the first inlet 602 may receive a first fluid such as a liquid and the second inlet 604 may receive a second fluid such as a gas. In various embodiments, the fuel nozzle 236 provides for concentric passages for the first fluid and the second fluid. In various embodiments, the first fluid may be a liquid state of Jet-A, diesel, JP8, water and combinations thereof, and the second fluid may be a gas, such as Natural Gas, Natural Gas/Hydrogen Mixture, or 100% Hydrogen ($H_2$). In various embodiments, steam 460 may also be added to the first fluid and/or the second fluid. In various embodiments, each of the fluids are communicated through separate concentric passages within the fuel nozzle 236 such that gas turbine engine readily operates on either fuel or combinations thereof. For example, in various embodiments, the tube 612 provides a barrier between the first fluid (e.g., within the tube 612 and sourced from the first inlet 602) and the second fluid (e.g., in a space around the tube 612 and sourced from the second inlet 604). As noted, in various embodiments, the first fluid may be in a liquid state and the second fluid may be in a gaseous state. In various embodiments, the water can be in the form of steam or liquid water.

In various embodiments, the tube 612 is secured within the inlet housing 606 at a first end 614 and secured in or to the nozzle assembly 610 at a second end 616. In various embodiments, the connection at the first end 614 may include a seal, such as an O-ring, or the like. In various embodiments, the connection at the second end 616 may be via a braze, weld, thread, or other attachment to the nozzle assembly 610. In various embodiments, the tube 612 defines a first fluid passage 618 within the tube 612 and a second fluid passage 620 defined between an exterior surface of the tube 612 and an interior surface of the housings 606, 608. In various embodiments, the second fluid passage 620 may be an annular passage that surrounds the tube 612 along a length of the fuel nozzle 236. In various embodiments, the second fluid passage 620 defined within the housings 606, 608 and around the tube 612 provides for a buffer or heat shield to minimize or prevent coking of the fluid passing through the first fluid passage 618 within the tube 612. In various embodiments, the first fluid and the second fluid may be mixed and joined together at the nozzle assembly 610.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   an exhaust duct; and
   a fuel nozzle guide assembly, wherein the fuel nozzle guide assembly comprises:
      a housing;
      a tube arranged in the housing and defining a portion of a first fluid passage therein, the first fluid passage configured to include a first fluid, wherein a second fluid passage is defined, in part, between an exterior surface of the tube and an interior surface of the housing, the second fluid passage configured to include a second fluid;
      an air inflow tube, the air inflow tube arranged along a nozzle axis, the air inflow tube defining a central air passage and configured to include a third fluid, wherein the first fluid passage extends axially at a first position radially outward from the central air passage, and the second fluid passage extends axially at a second position radially outward from the first fluid passage;
      an annular hood;
      an air inflow assembly;
      wherein the air inflow assembly defines a third fluid passage and is configured to include a fourth fluid, wherein the third fluid passage is radially outward from the second fluid passage, wherein the fourth fluid is steam, wherein the air inflow assembly receives the fourth fluid via the annular hood, wherein the annular hood comprises a plurality of circumferentially distributed hood ports that direct the steam to the air inflow assembly; and
      a nozzle outlet configured to receive each of the first fluid, the second fluid, the third fluid, and the fourth fluid to cause mixing thereof,
   wherein the gas turbine engine further comprises a steam connection between the annular hood and the exhaust duct of the gas turbine engine, the steam connection configured to direct steam extracted from exhaust in the exhaust duct to the annular hood, and
   wherein the annular hood defines an annular inside diameter manifold and an annular outside diameter manifold, the annular inside diameter manifold and the annular outside diameter manifold each coupled to a respective feeder tube and configured to receive separate respective flows of steam from the steam connection via the respective feeder tubes.

2. The gas turbine engine of claim 1, wherein mixing the fourth fluid with the first fluid, the second fluid, and the third fluid reduces auto-ignition and flashback inside the fuel nozzle guide assembly.

3. The gas turbine engine of claim 1, wherein the air inflow assembly is at least one of an outer vane swirl assembly or a guide swirler assembly.

4. The gas turbine engine of claim 1, wherein the second fluid is a gaseous fuel comprising 100% hydrogen.

5. The gas turbine engine of claim 4, wherein the second fluid is mixed with the steam or liquid water.

6. The gas turbine engine of claim 1, wherein the first fluid is a liquid fuel and the third fluid is air.

7. The gas turbine engine of claim 6, wherein the first fluid is mixed with the steam or liquid water.

8. A gas turbine engine comprising:
   an exhaust duct; and
   a combustor, wherein the combustor comprises:
      a fuel nozzle guide assembly, the fuel nozzle guide assembly comprising:
         a housing;
         a tube arranged in the housing and defining a portion of a first fluid passage therein, the first fluid passage configured to include a first fluid, wherein a second fluid passage is defined, in part, between an exterior surface of the tube and an interior surface of the housing, the second fluid passage configured to include a second fluid;
         an air inflow tube, the air inflow tube arranged along a nozzle axis, the air inflow tube defining a central air passage and configured to include a third fluid, wherein the first fluid passage extends axially at a first position radially outward from the central air passage, and the second fluid passage extends axially at a second position radially outward from the first fluid passage;
         an annular hood;
         an air inflow assembly;
         wherein the air inflow assembly defines a third fluid passage and is configured to include a fourth fluid, wherein the third fluid passage is radially outward from the second fluid passage and wherein the fourth fluid is steam, wherein the air inflow assembly receives the fourth fluid via the annular hood, wherein the annular hood comprises a plurality of circumferentially distributed hood ports that direct the steam to the air inflow assembly; and
         a nozzle outlet configured to receive each of the first fluid, the second fluid, the third fluid, and the fourth fluid to cause mixing thereof,
      wherein the gas turbine engine further comprises a steam connection between the annular hood and the exhaust duct of the gas turbine engine, the steam connection configured to direct steam extracted from exhaust in the exhaust duct to the annular hood, and
      wherein the annular hood defines an annular inside diameter manifold and an annular outside diameter manifold, the annular inside diameter manifold and the annular outside diameter manifold each coupled to a respective feeder tube and configured to receive separate respective flows of steam from the steam connection via the respective feeder tubes.

9. The gas turbine engine of claim 8, wherein mixing the fourth fluid with the first fluid, the second fluid, and the third fluid reduces auto-ignition and flashback inside the fuel nozzle guide assembly.

10. The gas turbine engine of claim 8, wherein the air inflow assembly is at least one of an outer vane swirl assembly or a guide swirler assembly.

11. The gas turbine engine of claim 8, wherein the second fluid is a gaseous fuel comprising 100% hydrogen.

12. The gas turbine engine of claim 11, wherein the second fluid is mixed with the steam or liquid water.

13. The gas turbine engine of claim 8, wherein the first fluid is a liquid fuel and the third fluid is air.

14. The gas turbine engine of claim 13, wherein the first fluid is mixed with the steam or liquid water.

* * * * *